United States Patent
Caruk

(10) Patent No.: US 7,293,127 B2
(45) Date of Patent: Nov. 6, 2007

(54) METHOD AND DEVICE FOR TRANSMITTING DATA USING A PCI EXPRESS PORT

(75) Inventor: Gordon F. Caruk, Bramalea (CA)

(73) Assignee: ATI Technologies, Inc., Ontario (CA)

( * ) Notice: Subject to any disclaimer, the term of this patent is extended or adjusted under 35 U.S.C. 154(b) by 244 days.

(21) Appl. No.: 10/757,882

(22) Filed: Jan. 15, 2004

(65) Prior Publication Data

US 2005/0160212 A1 Jul. 21, 2005

(51) Int. Cl.
- G06F 13/14 (2006.01)
- G06F 13/20 (2006.01)
- G06F 13/28 (2006.01)
- H04L 12/28 (2006.01)
- G06F 3/00 (2006.01)

(52) U.S. Cl. .................... 710/305; 710/302

(58) Field of Classification Search ............. 710/100, 710/33, 300–302, 72, 306, 313, 14, 106, 710/107, 305, 311; 345/520, 531; 361/679, 361/683, 783; 709/253; 326/37; 375/376; 270/254; 370/351, 254

See application file for complete search history.

(56) References Cited

U.S. PATENT DOCUMENTS

| | | | | |
|---|---|---|---|---|
| 4,554,657 A | * | 11/1985 | Wilson | 370/364 |
| 4,703,198 A | * | 10/1987 | Porter et al. | 326/86 |
| 5,113,369 A | * | 5/1992 | Kinoshita | 710/307 |
| 5,396,231 A | * | 3/1995 | Hein | 340/2.22 |
| 5,767,701 A | * | 6/1998 | Choy et al. | 326/93 |
| 5,937,176 A | * | 8/1999 | Beasley et al. | 710/317 |
| 6,731,134 B1 | * | 5/2004 | Bucossi et al. | 326/56 |
| 6,806,817 B2 | * | 10/2004 | Abrosimov | 341/53 |
| 6,825,693 B2 | * | 11/2004 | Schoenborn et al. | 326/86 |
| 6,856,169 B2 | * | 2/2005 | Frans et al. | 326/82 |
| 6,906,549 B2 | * | 6/2005 | Schoenborn et al. | 326/30 |
| 6,976,102 B1 | * | 12/2005 | Groen et al. | 710/72 |
| 6,992,987 B2 | * | 1/2006 | Kobayashi | 370/252 |
| 2004/0172494 A1 | * | 9/2004 | Pettey et al. | 710/305 |
| 2005/0160212 A1 | * | 7/2005 | Caruk | 710/301 |
| 2005/0251609 A1 | * | 11/2005 | Chou et al. | 710/313 |

OTHER PUBLICATIONS

"Can memory-less network adapters benefit next-generation infiniband systems?" by Sur et al. (abstract only) Publication Date: Aug. 17-19, 2005.*

"Introduction to PCI Express-a new high speed serial bus" by Dhawan, S.K. (abstract only)☐☐Publication Date: Oct. 23-29, 2005.*

* cited by examiner

Primary Examiner—Gopal C. Ray

(57) ABSTRACT

A data port operates to support symmetric PCI Express-type data transfers when in a first mode of operation. When in a second mode of operation, at least a portion of the data port connections are used to support an asymmetric PCI Express-type data transfer. The asymmetric data transfer is accommodated by supporting, with respect to the asymmetric data port, partial data lanes, thereby reducing the number of data channels implemented in a direction of the lower data rate transfer.

18 Claims, 7 Drawing Sheets

METHOD AND DEVICE FOR TRANSMITTING DATA USING A PCI EXPRESS PORT

BACKGROUND

As the processing power of computers increases so has the need for ever faster data transfer rates. Data transfers between computers and computer add-on components have traditionally been accommodated by industry accepted standards. Examples of industry standard bus types include PCI (Peripheral Component Interconnect), AGP (Accelerated Graphics Port), and SCSI (Small Computer Systems Interface) busses. Another type of data bus for supporting data transfers is generally referred to as PCI Express. PCI Express-type technology defines a standardized method of transferring symmetric data between a general purpose computing device, such as a laptop computer, and an add-in board or device. PCI Express technology defines symmetrical links (channels), as a result, peripheral devices that themselves transfer data asymmetrically use PCI Express technology in an inefficient manner. Therefore, a system and/or method that overcomes this problem would be useful.

FIELD OF THE DISCLOSURE

The present disclosure relates generally to the transfer of data, and more particularly, to asymmetric data transfers.

BRIEF DESCRIPTION OF THE DRAWINGS

The present disclosure may be better understood, and its numerous features and advantages made apparent to those skilled in the art by referencing the accompanying drawings, wherein.

DETAILED DESCRIPTION OF THE DRAWINGS

In accordance with a specific embodiment of the present disclosure, a data port operates to support symmetric PCI Express-type data transfers when in a first mode of operation. When in a second mode of operation, at least a portion of the data port connections are used to support an asymmetric PCI Express-type data transfer. The asymmetric data transfer is accommodated by supporting, with respect to the asymmetric data port, partial data lanes, thereby reducing the number of data channels implemented in a direction of the lower data rate transfer. Reducing the number of PCI Express-type data channels in the direction of the lower data rate results in a more efficient use of data channels as compared to symmetric transfers that have the lower rate channel bandwidth defined by the higher rate channel.

The unused portion of the data lanes, those channels no longer used for the lower data rate transfer, can now be configured to implement an additional PCI Express data port. This is accomplished by implementing a portion of the channels with the additional receivers and/or transmitters required to either transmit or receive data according to the PCI Express specification. Specific embodiments of the present disclosure can be better understood with reference to FIGS. 1-8 herein.

Figure 1:
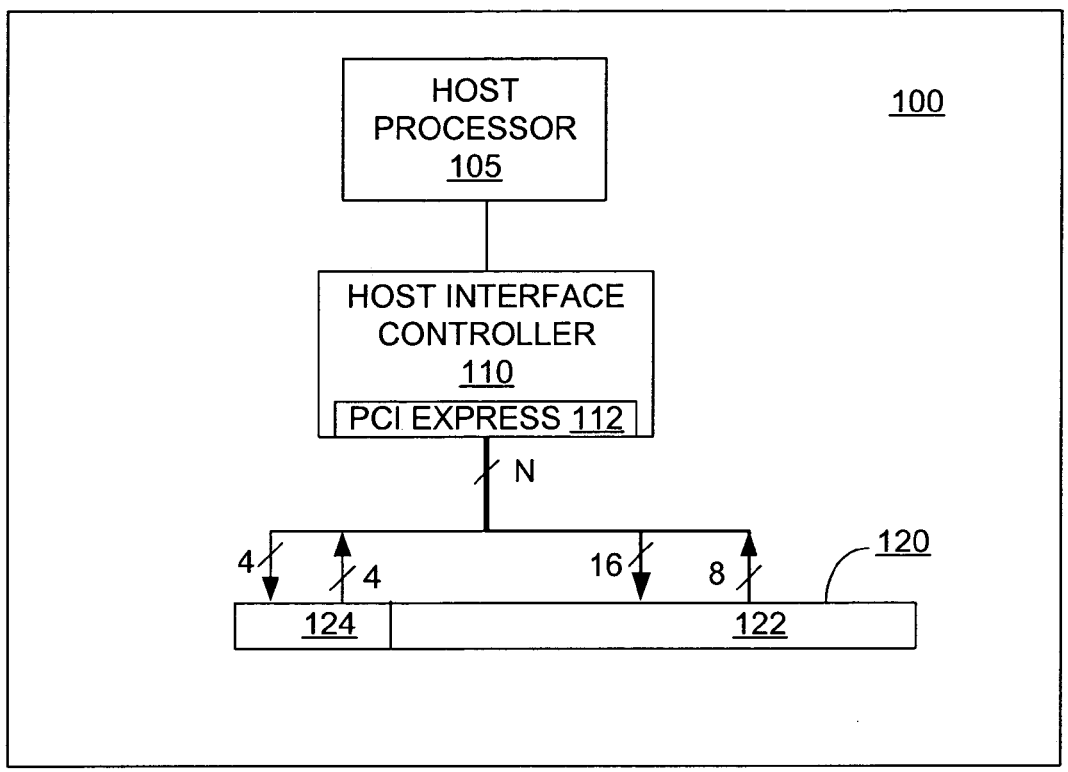
FIG. 1 discloses in block diagram form, a system diagram in accordance with the present disclosure.

FIG. 1 illustrates, in block diagram form, a system 100 comprising a host processor 105, a host interface controller 110, and a port connector 120.

In operation, the host processor 105 is typically associated with a general purpose computing device, such as a personal computer. The host processor 105 is operably coupled to the host interface controller 110, which provides host processor 105 with data transfer support. The host interface controller 110 may be part of a discrete or integrated device. For example, the host interface controller 110 may be part of a northbridge device/chipset, or integrated with the host processor 110.

The host interface controller 110 includes a PCI Express interface block 112. The PCI Express interface block 112 includes a plurality of lane buffers, each including at least one transmit channel (labeled in FIG. 2 as T0-TF) and one receive channel (labeled in FIG. 2 as R0-RF) to provide and receive data through respective data transmit connectors and data receive connectors.

In a first mode of operation, port interface connector 120 operates to provide data to a peripheral device in a symmetric manner, whereby an equal number of data lanes, i.e. transmitter/receiver pairs, are used.

In a second mode of operation, a port interface connector 122, which includes only a portion of the connections of port 120, operates to provide data to a peripheral device in an asymmetric manner, whereby a different number of receive and transmit channels are used to support different maximum data rates. In other words, the number of data receive connectors is different than the number of data transmit connectors with respect to a specific device. For example, reference number 122 represents an asymmetric PCI Express-type port using only a portion of the total available number of port connections. This is specifically illustrated by the different number of data transmit and receive connections between the PCI Express port 122 and the PCI Express interface block 112. Specifically, the PCI Express-type port 122 is illustrated to have 16 data transmit connections receiving data from the PCI Express interface block 112, and only 8 data receive connections receiving data to be provided to the PCI Express interface block 112.

When using PCI Express-type port 122 to operate in an asymmetric mode, there are eight unused PCI Express port connectors and a corresponding number of unused PCI Express-type data buffers available. Therefore, a secondary port can be implemented. For example, port 124, which is illustrated to be a symmetrical port, can be implemented without adding connectors. Ports 122 and 124 can also be connected in separate connectors to provide separate connections to individual adapters; in the example, one adapter connected asymmetrically to port 122, and another adapter connected symmetrically to port 124.

It will be appreciated that in specific embodiments, the number of data receive connections and data transmit connections dedicated to the PCI Express port 122 can vary from those numbers indicated. Furthermore, it will be appreciated that the secondary port 124 may itself be divided up into more than a single PCI Express-type port capable of supporting symmetric data transfer. This will be better illustrated with reference to FIG. 2.

Figure 2:
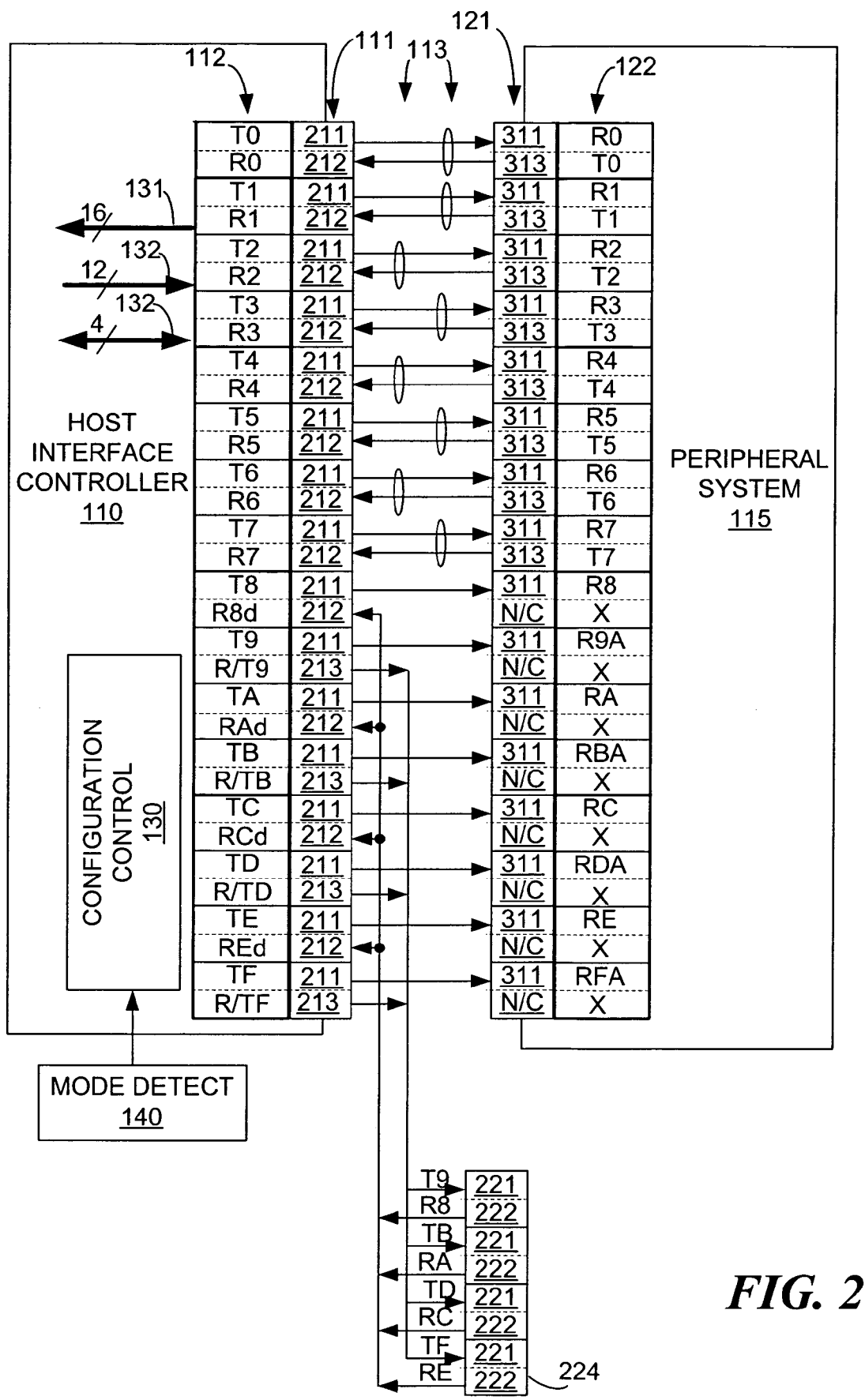
FIG. 2 illustrates, in block diagram form, a specific implementation of a system using a PCI Express interface in accordance with the present disclosure.

FIG. 2 illustrates, in block diagram form, a specific implementation of the host interface controller 110, a mode detect module 140, a peripheral system 115, and a secondary PCI Express-type port 224.

Host interface controller 110 is illustrated to comprise internal data paths 131, 132, and 133, PCI Express-type data I/O buffers 112, and PCI Express-type interface connections 111.

The PCI Express-type interface connections 111 are effectively node locations that are coupled to the I/O buffers 112. Elements 211 are data transmit connections. The term data transmit connection is used herein to refer to node locations that are coupled to a transmitter I/O port of the PCI Express interface block 112. Elements 212 are data receive connections. The term data receive connection is used here to refer to node locations that are coupled to a receiver I/O port of the PCI Express interface block 112. Elements 213 are configurable data connections. The term configurable data connection 213 is used here to refer to node locations that can be coupled to either a transmitter or receiver I/O port of the interface block 112.

Commonly numbered non configurable receivers and transmitters, such as T0 and R0, of the data I/O buffers 112 enable functionality of PCI Express lane pairs. For example, when the data transmit connections 211 are coupled to transmitter I/O buffers, and the data receive connections 212 are coupled to receive I/O buffers, symmetrical PCI Express lane pairs 113 are formed. The configurable data connections 213 can function as either a data receive connection or a data transmit connection based on a mode of operation by selecting a transmitter or receiver of a corresponding I/O buffer to be enabled. As illustrated by the data flow arrows of FIG. 2, the configurable data connections 213 are functioning as data transmit connections In that the transmitter I/O buffers of their respective I/O ports 112 are enabled. For example, the data I/O buffers R/T9, R/TB, R/TD, and R/TF of FIG. 2 all represent data I/O buffers that are configured as transmitters, thereby allowing data to be transmitted through its corresponding data connector 213 to port 224.

The term lane pair is used herein to refer to the connections associated with commonly numbered I/O buffers of FIG. 2 (e.g., R0 and T0). The term bidirectional lane pair is used to indicate a set of connections configured to receive and provide data (e.g., the R0/T0 lane pair connections) such as is associated with symmetric PCI Express data transfers. The term unidirectional lane pair is used herein to indicate a set of lane pair connections configured to only receive or provide data (e.g., T9 and R/T9 connections as configured in FIG. 2) such as is associated with asymmetric data transfers.

In the specific embodiment illustrated, the mode detect module 140 is operable to detect a specific mode of operation. The module 140 may detect a mode, such as symmetric or asymmetric data mode, by hardware or software. With respect to FIG. 2, mode of operation will be detected to support the peripheral device 115, which is an asymmetric peripheral device having using 16 receive connectors 311 and 8 transmit connectors 312. The configuration control module 130 configures the configurable I/O buffer of the host interface controller 110 to support a corresponding 16 transmit connections, to connect to the receive connections of the peripheral 115, and 8 receive connections, to connect to the transmit connectors of the peripheral 115. In addition, the configuration control 130 will enable appropriate software and/or hardware to support the data transfers between the host interface controller 110 and the host processor.

FIG. 2 further shows a peripheral system 115 that receives data transmitted over data lanes 113 and individual channels (data lane portions) to data receive connections 311 and data transmit connections 312. It will be appreciated that, relative to the peripheral system 115, the data receive connections 311 are coupled to the data transmit connectors 211 of the host-interface controller 110. Similarly, the data transmit connections 312 of the peripheral system are coupled to corresponding data receiver connections 212 of the peripheral system 115.

The peripheral system 115 has a different number of receiver buffers than transmit buffers to facilitate the transmission of data asymmetrically between the host interface controller 110. Because not all of the transmit buffers of the peripheral 115 are used, or possibly even implemented, there will be a corresponding number of connections, that would otherwise be data transmit connections of the peripheral 115, labeled as no connects (N/C).

Specific examples of a peripheral system that do not benefit from symmetric data are network adapters, two- and three-dimensional video and graphics systems controllers, and many video applications. Many such image processing systems do not benefit from symmetrical data transfers because they need to receive much more data (image data) from a host device for display than it would need to return. In the specific example illustrated in FIG. 2, there are 16 data receive connections 311 associated with the peripheral system 115 for receiving data form a host device, while there are only 8 data receive connections 113 associated with the peripheral system 115. In other implementations, the number of transmit and receive connections 311 and 313 can vary. For example, the peripheral 115 can have 4, 2, or even 1 data transmit connector(s). It can be appreciated that, while this discussion has more channels transmitting to 115 than the number of receiving channels, this discussion is as applicable to an implementation that uses less channels transmitting to 115 than the number that are receiving from 115.

The channels associated with the interface block 112 that are not used by the peripheral system 115 are available to implement a secondary PCI Express-type data port 224. In the specific example illustrated, the receive input buffers of the interface block 112 unused by the peripheral 115 include buffers R8d, RAd, RCd and REd, where the "d" suffix indicates that the buffer is capable of connecting to one of two input ports (See FIG. 4). In another embodiment, there is no mux needed at the input of the buffer in FIG. 4. The ports are simply wired on the motherboard to connect to their appropriate ports. Therefore, this would not be something that is done dynamically. The components discover the configuration that they are instantiated in, and train and configure their links to the appropriate widths and number of ports. It will be appreciated that in an alternate embodiment, direct connections would be done with a single set of ports only. For example, 213 would be wired directly to 224, and there would be no connection to 115. In this embodiment, there is either a direct connection to 115 (symmetric) or a direct connection to 224 (asymmetric).

For example, where the mux 213 is used, the channels of FIG. 2 are coupled through one of the two input ports to corresponding data receive connections 222 of the secondary port 224. Without modification, a conventional PCI Express interface block, given the peripheral 115, would have no transmit buffers available, only 8 unused receive buffers. To overcome this issue, a subset of the otherwise unused receive buffers, in the interface block 112, have been implemented as configurable buffers R/T9, R/TB, R/TD, and R/TF that can be configured as transmit buffers. Therefore, in the implementation illustrated in FIG. 2, the PCI Express-type port 224 has a plurality of data transmit connectors 221 that are connected to selected configurable connections 213, thus allowing an equal number of data transmit connectors and data receive connectors.

The system illustrated in FIG. 2 provides specific advantages over symmetric PCI Express systems, in that it allows for a peripheral system, such as a video card, to transmit data asymmetrically, thereby allowing a secondary port capable of supporting one or more additional peripherals to be utilized.

Figure 3:
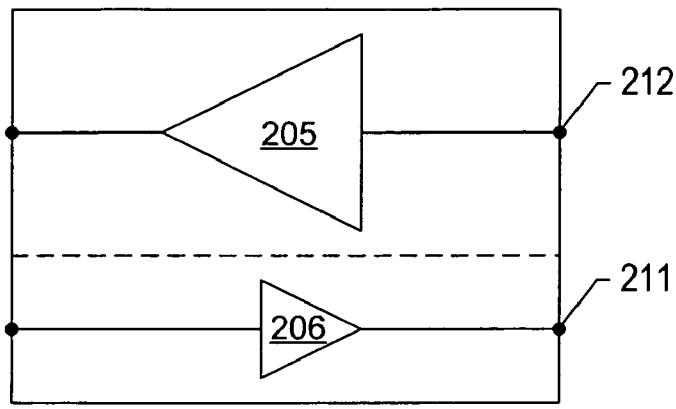
FIGS. 3-5 illustrate data buffers associated with specific data lanes.

FIG. 3 illustrates a traditional lane buffer, such as that used to implement transmit and receive buffers T1 and R1 of interface block 112, respectively. Specifically, the receiver 205 and transmitter 206 are independent buffer channels from each other, where the interface block provides a set of signal pairs, each of which can be differential pairs, to form a data lane 113. As illustrated in FIG. 3, the data receive buffer is typically larger in size than the data transmit buffer. Representative locations of data transmit connections 211 and data receive connections 211 are also illustrated.

Figure 4:
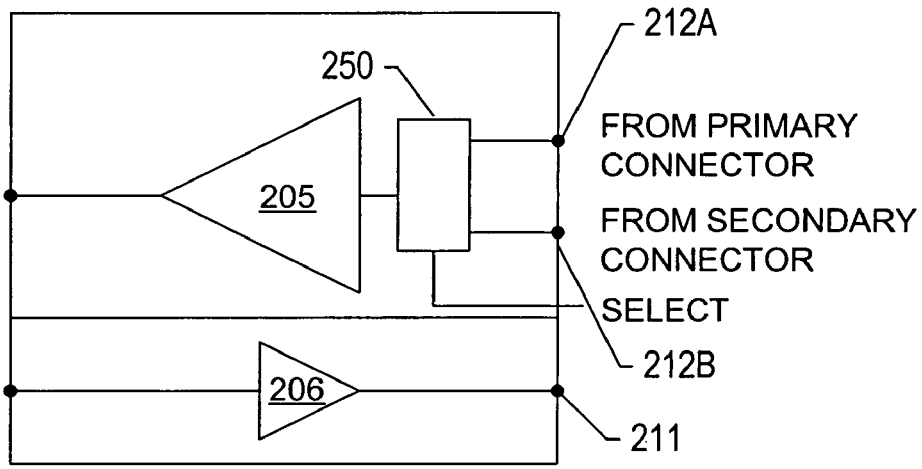

FIG. 4 illustrates a data lane buffer, such as the block that includes T8 and R8, of interface block 112, where the receiver 205 can receive data from either a primary or secondary connector. In one embodiment, the primary connector, such as 212A, would be to the peripheral system 115, while the secondary connector, such as 212B, would be to an alternate location, such as secondary buffer 224. A select signal controls which of the primary and secondary interface is selected.

Figure 5:
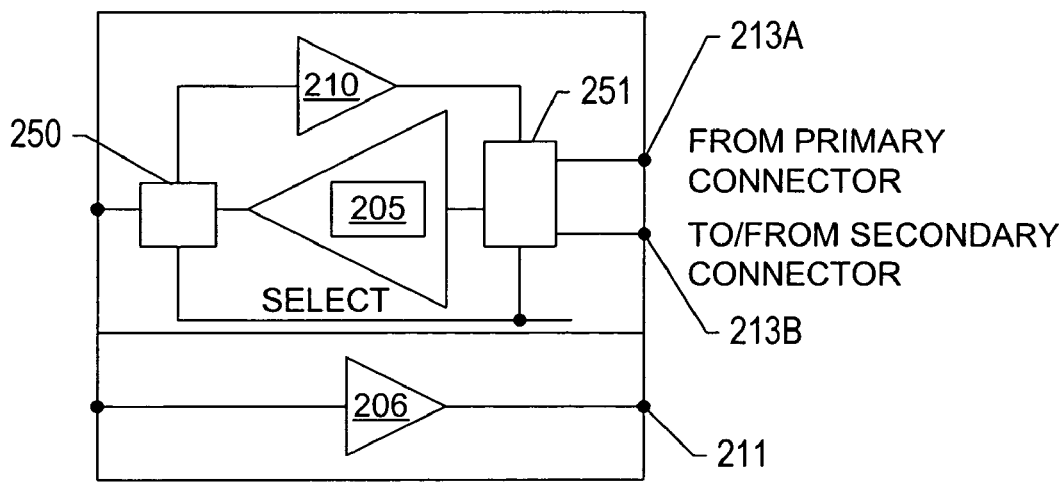

FIG. 5 illustrates a specific buffer 213 of the interface block 112 having a configurable channel including a transmitter 210 and a receiver 205, thereby allowing the configurable channel to be configured as either a transmitter channel or a receiver channel. For example, FIG. 5 may represent the lane buffer having channels T9 and R/T9 in FIG. 1. The transmit portion 206 of the buffer T9 is non-configurable. In one embodiment, the receive/transmit state of the configurable channel of FIG. 5 is selectable by control 250 depending upon a state of the select line, which is typically controlled by the configuration control 130. Control 251 is also responsible for coupling the receiver 205 to one of the primary connector and the secondary connector, thus allowing either the transmitter 210 or the receiver 205 to be coupled to the primary (213A) or secondary (213B) port. In this manner, the data can be routed and configured as appropriate to implement the specific disclosure of FIG. 2.

In another embodiment, the control mux 251 of FIG. 5 can represent a single hard wired connection to a single specific port connection. Also, the internal component connections 250 to the output of the receiver 205 and to the input of the transmitter 210 can be independent connections to the host controller 110, as opposed to a muxed connection. When a direct connection at the input of the receiver 205 and the output of the transmitter 210 is used, transmitter 210 should be turned off, so that it does not cause signal integrity issues when the buffer 205 is used as a receiver.

Figure 6:
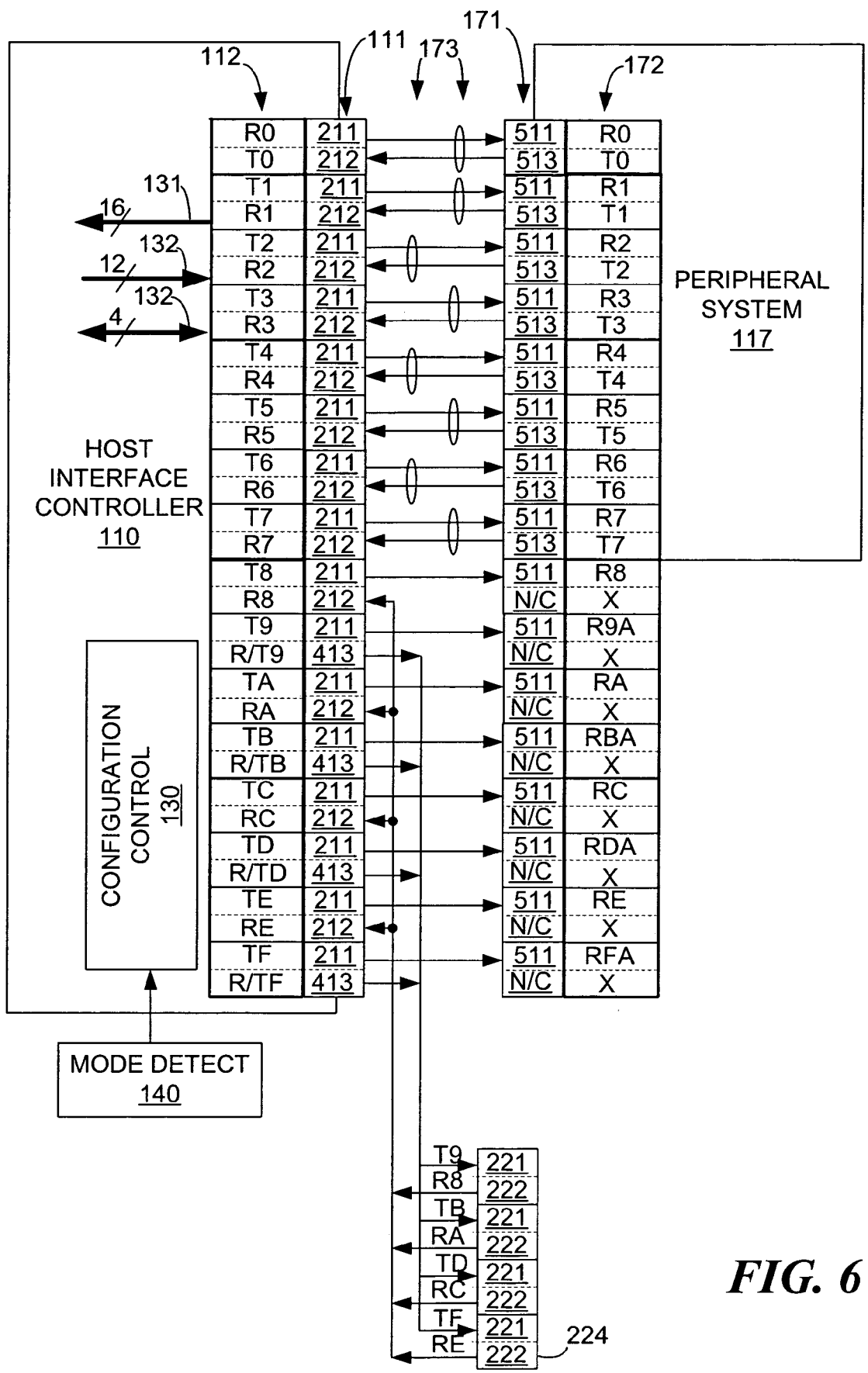
FIGS. 6-8 illustrate, in block diagram form, specific system embodiments in accordance with the present disclosure.

FIG. 6 illustrates another implementation in accordance with the present disclosure utilizing the host interface controller 110 of FIG. 2. Specifically, the portions of the host interface controller 110 remain unchanged. However, the peripheral system 117 now replaces the peripheral system 115. In the specific implementation, the peripheral system 117 is a system that requires symmetric data support from a portion of the data lanes, 8 in the example illustrated. To this extent, the peripheral system 117 is illustrated to connect to only the symmetric connections of the available PCI Express-type ports, allowing the peripheral 117 to transmit data a symmetric manner. It will be appreciated that in other embodiments, a peripheral could couple to fewer that eight data lanes of the host interface controller to communication in a symmetric manner.

By performing appropriate mode detection to recognize the peripheral system 117 as a symmetric system, by querying the peripheral or monitoring a hardware feature, the host interface controller 110 can provide an appropriately configured interface, whereby data is only provided channels implemented by the peripheral. Allowing mode detect portion 140 to detect different peripheral systems, allows for the flexibility to support different types of peripheral devices, such as video systems, that be either symmetric or asymmetric peripherals, depending upon a specific implementation. It will be appreciated, mode detection can be implemented in many ways, including the detection of a jumper or hardware feature, the interrogation of a peripheral by a driver, or by pre-set start-up information.

Figure 7:
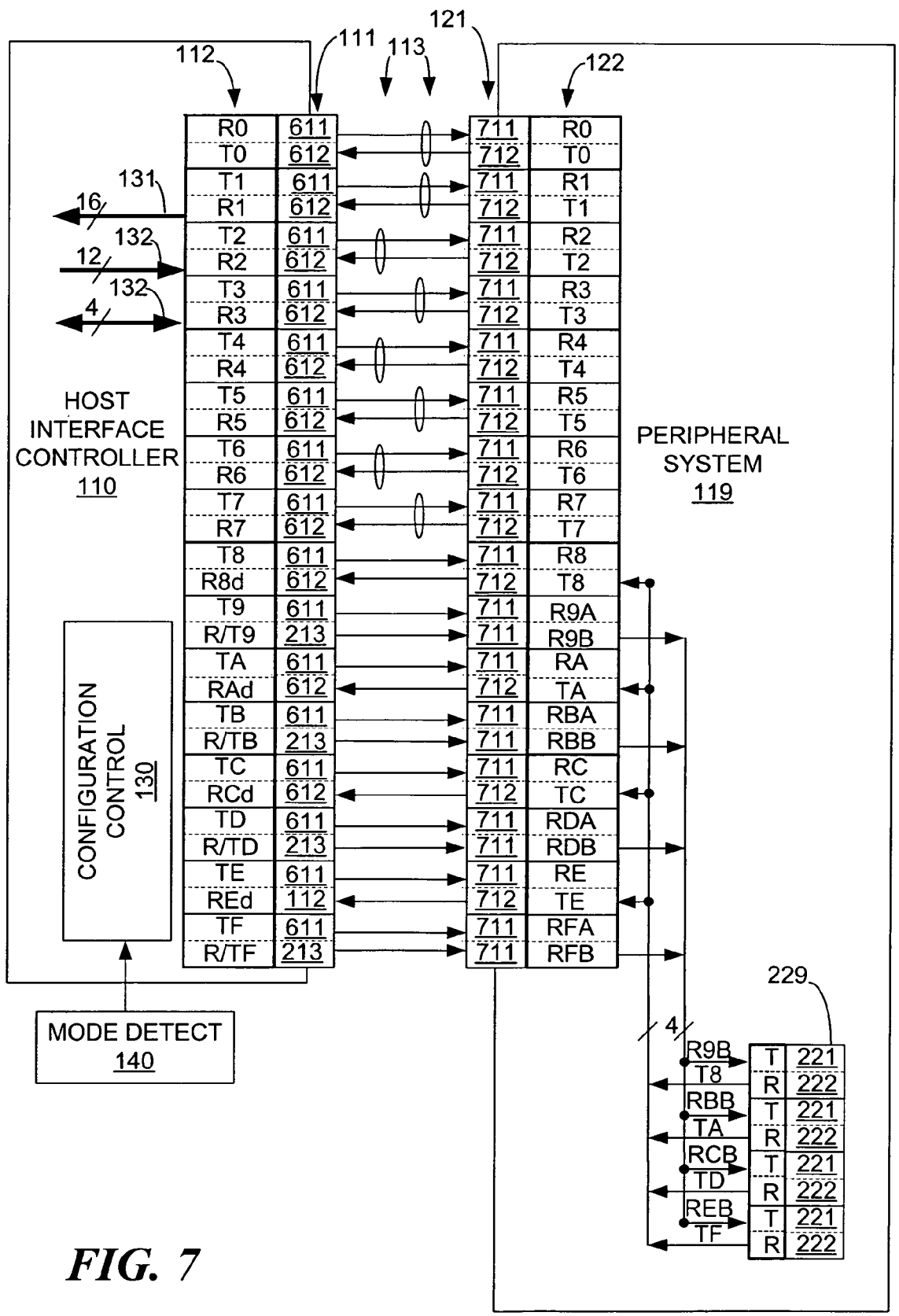

FIG. 7 illustrates an alternate embodiment of the present disclosure, where the secondary PCI Express port is implemented through the peripheral system 119, instead of through a system board (e.g., motherboard). With the implementation of FIG. 7, the host interface connector 110 passes data through all of the PCI Express transmit and receive channels to the peripheral system 119. However, even though data can be passed through all of the channels, asymmetric communications with the peripheral is accomplished in that only a portion of the channels supports the data requirements of the peripheral's primary function. The remainder of the channels provide data to the peripheral 119 so that a secondary port 229 can be support an alternate peripheral. During mode detection, the host interface controller 110, will determine the channels used to provide asymmetric data to support the peripheral system 119 functionality, as well as the channels used to support any peripherals associated with the secondary port 229.

Figure 8:
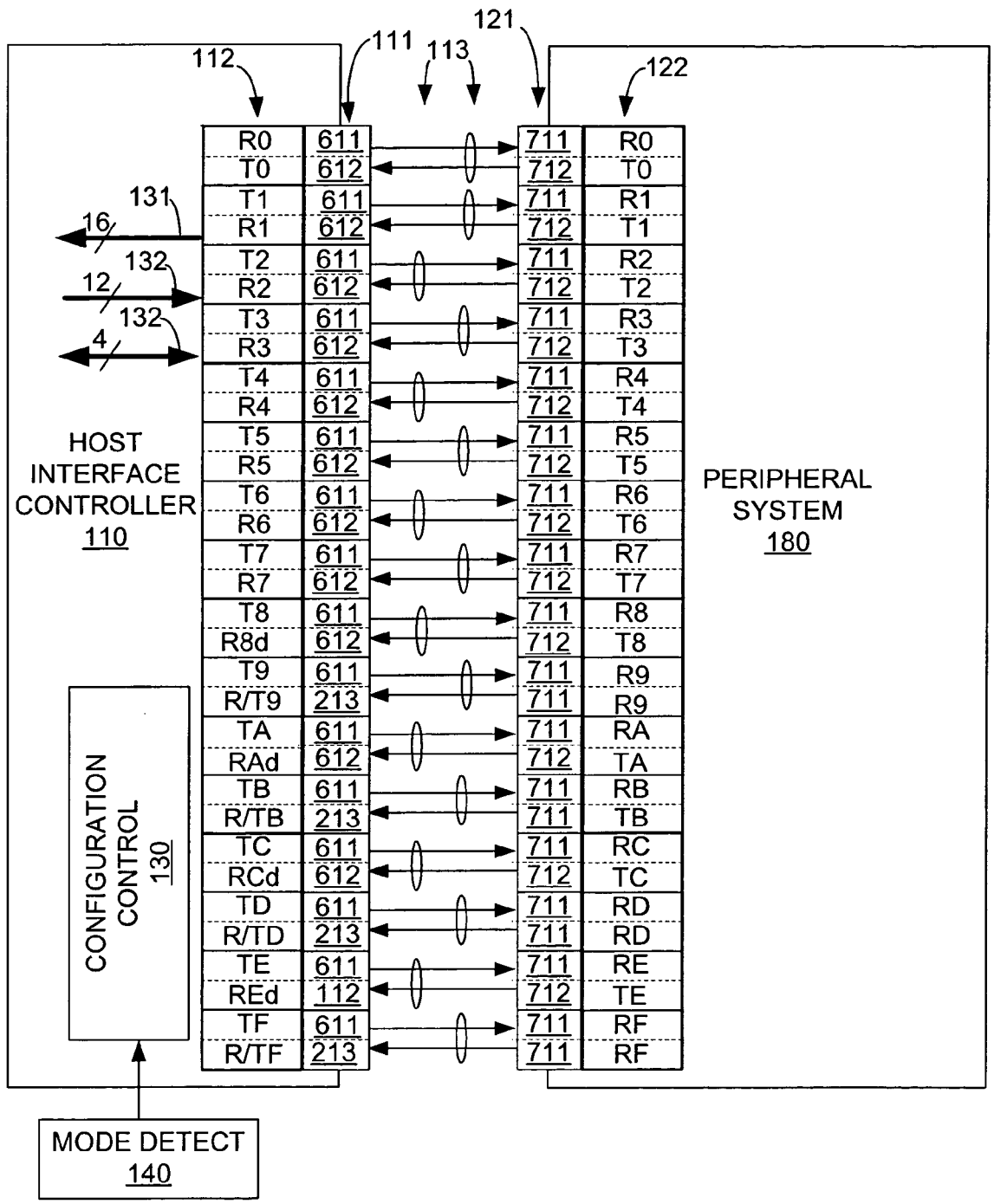

FIG. 8 illustrates an embodiment where the host interface controller 110 is operating to support a symmetric peripheral system 180. It will be noted that in this implementation the connections at the host interface controller 110 do not change between the embodiment of FIG. 7 and the embodiment of FIG. 8, only the configuration of the interface block 112, and support of the channel assignments vary.

Figure 9:
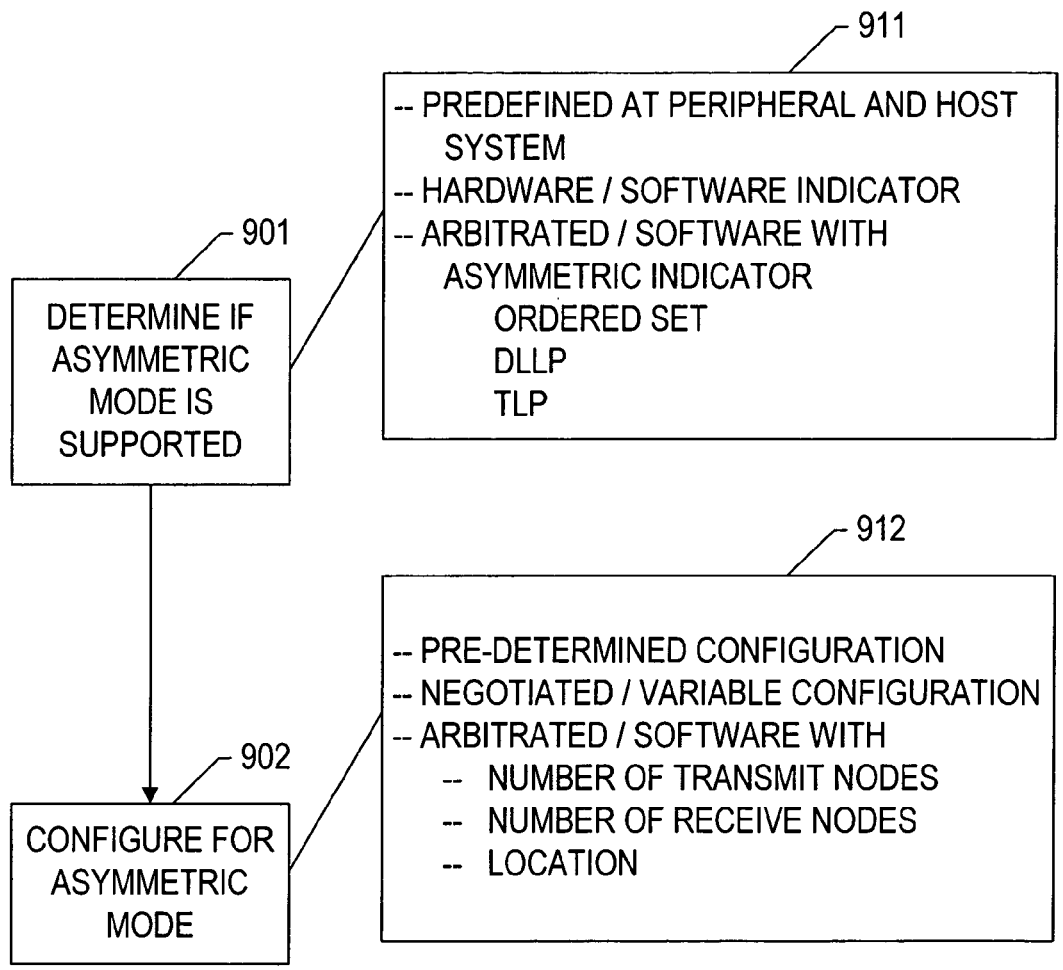
FIG. 9 illustrates a flow diagram of a particular embodiment for configuring a system in an asymmetric mode.

FIG. 9 illustrates method for configuring the systems described herein. At step 901, a determination is made whether an asymmetric mode is supported.

In one embodiment, support of the asymmetric data transfers is predefined at both a host system and a peripheral system. When predefined, the host and peripheral can synchronize based on a predefined initialization routine that has been configured based on the asymmetric configuration, and can thereby verify proper operation of the bidirectional and unidirectional lanes as part of the initialization process. The initialization routine will be based on the PCI Express specification to verify operation of the transmit and receive nodes, whether part of a bi-directional or unidirectional lane.

In another embodiment, a hardware indicator can be used to determine that asymmetric mode is to be supported. Such an indicator can be a hardwired connection, or a user configurable connection on one or both of the host and peripheral systems.

In another embodiment, a software indicator can be used to determine when the use of asymmetric data transfers is to be used. Such a software indicator can occur during or after a first initialization of the PCI Express link. When the software indicator is set after a first initialization, i.e., after initialization of a symmetric PCI Express link, such as by setting a register of one or both of the host and peripheral system, a change in the mode of operation between symmetric and asymmetric modes can occur either with or without a new initialization/training sequence. For example, after a symmetric PCI Express initialization sequence is completed, data transferred over the PCI Express link can set a register at the peripheral or host to indicate that a change in configuration, i.e. to an asymmetric configuration, is desired. Based on this indicator, a second initialization of the PCI Express link can occur or, the unidirectional mode can be implemented directly without a new synchronization.

When indication of asymmetric mode is provided, whether in hardware or software, it can be passed as a data indicator using the PCI Express protocol by setting a bit as an indicator at an unused location within an Ordered Set of data (such as at a reserved bit of symbol 2 of a TS1 Ordered Set).

At step 902, configuration for asymmetric mode occurs. In one embodiment, the configuration of the asymmetric mode is predefined. When predefined, the number and location of the unidirectional lanes are known by the initialization routines of both the host and peripheral. The initialization and configuration control of the asymmetric configuration is based on the PCI Express specification, which is modified to allow the extra transmitter or receiver of a unidirectional lane of the port to be properly configured along with the bidirectional lanes during the initialization process.

When the configuration for asymmetric mode is not predefined, the number of unidirectional channels needs to be indicated. In one embodiment, the number of unidirectional transmit or receive channels can be communicated between the host and peripheral devices by using reserved bits in an ordered set used during initialization. For example, when unidirectional transmitters are to be used, a value indicating the number of unidirectional transmitter lanes can be stored at a specific reserved location of the TS1 Ordered Set, such as at bits 2-4 of the Data Rate Identifier symbol. Similarly, when bidirectional receivers are to be used, a value indicating the number of bidirectional receiver lanes can be stored at a specific reserved location of the TS1 Ordered Set, such as at bits 5-7 of the Data Rate Identifier symbol. In addition to specifying a number of unidirectional lanes, it will also be appreciated that the location of the lanes can also be specified by passing information in other reserved bit locations of Ordered Sets of the PCI Express specification. In addition, hardware indications of the quantity and location of unidirectional lanes can also be implemented. When selection of a symmetric mode occurs after a first initialization, the number and location of unidirectional lanes can be communicated by data to register locations of the host and system.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. In addition, it will be appreciated that the functional blocks shown in the figures could be further combined or divided in a number of manners without departing from the spirit or scope of the invention. The preceding detailed description is, therefore, not intended to be limited to the specific forms set forth herein, but on the contrary, it is intended to cover such alternatives, modifications, and equivalents, as can be reasonably included within the spirit and scope of the appended claims. For example, in FIG. 2, connections to 224 are shown from the connector 111, it will be appreciated that the connection to 224 can originate from connector 121 as well. Likewise, FIG. 2, block 240 can be part of the peripheral system 115.

For example, while the preceding disclosure is described with reference to transmitting more data than it receives it can instead receive more data than is transmits. Also, while the disclosure is with reference to the PCI Express protocol, other similar PCI Express type protocols can be used.

What is claimed is:

1. A system having a motherboard, the motherboard comprising:
    a first set of connections facilitating a first port to support a symmetric PCI Express data transfer when in a first mode of operation; and
    a second set of connections facilitating a second port to support an asymmetric PCI Express data transfer when in a second mode of operation, wherein the second set of connections is a subset of the first set of connections.

2. The system of claim 1 wherein the first set of connections includes a plurality of bidirectional lane pairs and the second set of connections includes at least one unidirectional lane pair to support a unidirectional data transfer when in the second mode of operation.

3. The system of claim 1 further comprising:
    a mode detect module to determine a mode of operation as one of the first mode of operation and the second mode of operation.

4. The system of claim 1 further comprising the system being a host interface controller.

5. The system of claim 4, wherein the host interface controller is associated with a north-bridge controller.

6. The method of claim 4, wherein during the second mode of operation a number of data receive connections is greater that a number of data transmit connections.

7. The system of claim 1 further comprising the system being an image controller.

8. The system of claim 7 wherein the image controller is a graphics controller.

9. The system of claim 7 wherein the image controller is a video controller.

10. The method of claim 1, wherein during the second mode of operation a number of data transmit connections is greater that a number of data receive connections.

11. The method of claim 1, wherein during the second mode of operation a number of data receive connections is greater that a number of data transmit connections.

12. The method of claim 1, wherein during the second mode of operation a number of data receive connections is greater that a number of data receive connections.

13. A method comprising:
    when in a first mode of operation:
        transmitting data to a first peripheral system over a first plurality of PCI Express port connectors; and
        receiving data from the first peripheral system over a second plurality of PCI Express port connectors, wherein the second plurality is less than the first plurality;
        transmitting data to a second peripheral system over a third plurality of PCI Express port connections; and receiving data from the second peripheral device over a fourth plurality of PCI Express port connections, wherein the fourth plurality is equal in quantity to the third plurality.

14. The method of claim 13 further comprising:
when in a second mode of operation
transmitting data to a third peripheral system over the first plurality of PCI Express port connections; and
receiving data from the third peripheral device over the second, third and fourth plurality of PCI Express port connections.

15. The method of claim 13 further comprising:
determining a mode of operation to be one of a first mode of operation and a second mode of operation; and
configuring a system to operate in the mode of operation.

16. A system comprising a PCI Express port comprising:
a plurality of single bit transmitter/receiver pairs having one or more control inputs to configure a select one of the plurality of single bit transmitter/receiver pairs as a transmitter when the one or more control inputs receives a first select value, and as a receiver when the select input receives a second select value; and
a selection module configured to selectively couple the select one of the plurality of single bit transmitter/receiver pairs to one of a plurality of connectors based on a select signal.

17. The system of claim 16 wherein one of the one or more control inputs is to hold the transmitter in a high impedance state.

18. The system of claim 16 wherein the plurality comprises a number of four or greater.

* * * * *